3,074,912
STABILIZATION OF VINYL ACETATE
Charles E. Blades, Berkeley Heights, N.J., and Leonard F. Barrington, Decatur, Ill.; said Blades assignor to Air Reduction Company, Incorporated, New York, N.Y., a corporation of New York, and said Barrington assignor to A. E. Staley Manufacturing Company, Decatur, Ill., a corporation of Delaware
No Drawing. Filed Aug. 12, 1960, Ser. No. 49,125
13 Claims. (Cl. 260—45.95)

This invention relates to the stabilization of vinyl acetate against spontaneous polymerization.

More particularly, the present invention relates to a food grade antioxidant inhibitor which stabilizes vinyl acetate against spontaneous polymerization, and to vinyl acetate or vinyl acetate compositions containing such inhibitors.

The tendency of vinyl acetate monomer to undergo spontaneous polymerization at ordinary conditions of heat and light is well known. The spontaneous polymerization of vinyl acetate has obvious disadvantages, and leads to degradation of the vinyl acetate, thereby adversely affecting its value for subsequent commercial use.

It is, therefore, customary in the art to add stabilizers or inhibitors to the vinyl acetate to prevent spontaneous polymerization. Although these prior art stabilizers may be said to be generally effective in inhibiting spontaneous polymerization, when added to vinyl acetate to be used for special purposes, e.g., in the food processing or food packaging industries, they have many disadvantages.

For example, these prior art inhibitors usually are not of food grade, are toxic and may even impart color or odor to the vinyl acetate monomer, which toxicity, color or odor is in turn transferred to the vinyl acetate and to the compositions which are prepared from the vinyl acetate. Such inhibitors may not be used, therefore, in vinyl acetate which goes into the production of, for example, chewing gum bases, or foodstuff packaging material.

It is an object of the present invention to provide a food grade antioxidant stabilizer or inhibitor for vinyl acetate which is effective in small amounts to prevent spontaneous polymerization of the vinyl acetate, and which is non-toxic, odorless and colorless, and in all respects safe for human consumption.

Another object of the present invention is vinyl acetate or vinyl acetate compositions containing a small effective amount of such inhibitors.

According to the present invention, it has been discovered that various butyl hydroxyanisole compounds when added in small amounts to vinyl acetate exhibit the above-described properties.

The preferred isomers for use in the present invention have been identified as 2-tertiary butyl-4-hydroxyanisole, and 3-tertiary butyl-4-hydroxyanisole having the following formulae:

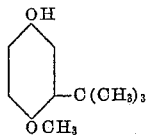

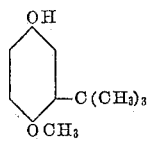

The isomers may be used alone or mixtures of the two isomers may be used. Mixtures are available commercially under a wide variety of trademarks. As an example may be mentioned Tenox BHA, manufactured by the Eastman Chemical Company, Kingsport, Tennessee. The ratio of 3-tertiary butyl-4-hydroxyanisole to 2-tertiary butyl-4-hydroxyanisole in the mixed compositions may vary from about 90:10 to 10:90.

Such isomers when added to vinyl acetate in small, effective amounts, inhibit spontaneous polymerization of the vinyl acetate. At the same time, the described materials are non-toxic, odorless and colorless. Moreover, when these inhibitors are added to vinyl acetate in effective amounts, the vinyl acetate may be safely used in the food processing and packaging industry.

The food grade antioxidants of the present invention should be added to the vinyl acetate in small effective concentrations. Amounts ranging from about 1 p.p.m. to 100 p.p.m. have been found to be effective. Preferably, the antioxidants described herein should be present in an amount of from about 10 p.p.m. to 40 p.p.m. Especially good results are achieved from vinyl acetate containing from about 10 p.p.m. to 25 p.p.m. of these food grade antioxidants.

The stabilizers or inhibitors of the present invention have the ability to inhibit spontaneous polymerization of the vinyl acetate not only at ordinary conditions of storage, but also at elevated temperatures for prolonged periods of time. Moreover, when a polymerization initiator is added to the stabilized vinyl acetate monomer, the stabilizers are susceptible to becoming inactive, either by decomposition or otherwise, thereby permitting polymerization to occur without first removing the stabilizer from the vinyl acetate monomer.

When a polymerization initiator is added to vinyl acetate containing the inhibitors or stabilizers of the present invention, and the temperature of the vinyl acetate elevated above room temperature, e.g. temperatures up to about 60° C. or higher, or between about 30° C. and 60° C. or higher, polymerization does not occur immediately. Rather, there is an induction period during which polymerization is suspended, or occurs to only an extremely limited or slight extent. This induction period is important in that it allows operational flexibility in carrying out the polymerization.

The induction period depends to a large extent on the stabilizer and the initiator employed. In general, when employing the stabilizers of the present invention, and conventional initiators, an induction period of about 30 minutes to 130 minutes or higher may be expected. The induction period also depends to a certain extent on the quantity of the inhibitor or stabilizer employed. The higher the quantity of the inhibitor used, the longer the induction period, generally speaking.

Among the conventional initiators or accelerators that may be mentioned are the free radical initiators such as the peroxides, hydrogen peroxide, potassium persulfate, benzoyl peroxide, and the azo-compounds, such as alpha-alpha'-azobis-iso-butyronitrile and the like.

The following examples are given to illustrate the preferred method of carrying out the invention, it being understood that various modifications or alterations may be made without departing from the spirit of the invention.

EXAMPLE I

Long term storage tests were conducted on vinyl acetate inhibited with a mixture of 2- and 3-(t-butyl)-4-hydroxyanisole.

Samples were prepared having concentrations of 10, 15, 20 and 25 p.p.m. of Tenox BHA, which was a mixture of 2- and 3-(t-butyl)-4-hydroxyanisole, sold by the Eastman Chemical Company, Kingsport, Tennessee. The ratio of the isomers in this composition corresponded to the ranges described hereinabove. The same stock solution of Tenox BHA was used in running all of the examples.

The vinyl acetate used was a distilled grade and had the physical properties and compositions shown in Table I.

Table I
ANALYSIS OF VINYL ACETATE

| | | |
|---|---|---|
| Vinyl acetate | weight percent | 99.9 |
| Aldehydes as acetaldehyde | do | 0.005 |
| Acid as acetic acid | do | 0.002 |
| Moisture | do | 0.02 |
| Color | | Colorless |
| Boiling range | °C | 71.9–72.9 |
| Specific gravity 20/20 | | 0.9341 |

An 0.4 percent stock solution of Tenox BHA in distilled vinyl acetate having the properties recorded in Table I was prepared. Enough of the stock solution was added to freshly distilled vinyl acetate having the properties recorded in Table I to give the desired concentration.

As a control was used a vinyl acetate containing 17 p.p.m. hydroquinone, which is a conventional stabilizer in the art, but not suitable when the vinyl acetate is to be used by the food industry, because of the fact that it is not of food grade and has toxic properties.

Samples having a concentration of Tenox BHA of 10, 15, 20 and 25 p.p.m. were placed in each of the following types of containers: (a) glass only, (b) glass and mild steel, and (c) glass and bonderized steel. Vinyl acetate containing 17 p.p.m. hydroquinone was used as a standard.

The containers and samples are stored in a dark atmosphere at room temperature and are tested periodically to observe if polymer formation has occurred. The test consists of evaporating a sample from each solution on a crystallizing dish and observing for film formation. Film formation, i.e., polymer, would, of course, indicate that polymerization had occurred.

After being subjected to the test for 30 days, no polymer formation was noticed in any sample.

As is clear from the above, the inhibitors of the present invention are extremely effective in preventing spontaneous polymerization of vinyl acetate.

EXAMPLE II

Samples prepared according to the procedure described in Example I, and containing 15 p.p.m. Tenox BHA were refluxed at 72.5° C. and 1 atm. pressure for a 24-hour period to determine if polymer formation would occur.

After refluxing, the samples were tested for polymer formation by evaporation of a portion thereof in an evaporating dish. The amount of polymer produced was about 0.22% by weight of the sample.

It is clear from the above that the stabilizers of the present invention are extremely effective in preventing spontaneous polymerization of the vinyl acetate for a prolonged period of time even at high temperature.

EXAMPLE III

This example evaluates the activity of the vinyl acetate containing the inhibitors or stabilizers of the present invention upon addition of a polymerization initiator or accelerator.

Vinyl acetate samples were prepared following the procedure of Example I.

A dilatometer tube, i.e., a capillary tube with a bulb attached to the base, was used in carrying out the polymerization. About 0.2 percent by weight of benzoyl peroxide (recrystallized) was added to the sample. The resulting mixture was placed in the dilatometer tube. The capillary tube was calibrated in centimeters, and the vinyl acetate mixture extended into the capillary section of the tube. The dilatometer was then placed in a constant temperature bath held at 60° C. and the position of the vinyl acetate mixture in the capillary noted.

As the vinyl acetate monomer polymerized, it contracted, thus lowering the level of the liquid in the capillary.

The change in level of the vinyl acetate in the capillary with time was noted, and the data was plotted on rectilinear graph paper using time in minutes as the abscissa and the change in level of the vinyl acetate in the capillary tube in centimeters as the ordinate.

The period of time from the time the tube reached equilibrium in the water bath to the first change in level of the monomer in the capillary was taken as the induction period. The slope of the linear portion of the curve was taken as the relative rate of polymerization in cm./min. All dilatometers used in the investigation had the same physical dimensions and thus polymerization rates could be judged relative to the conventionally used, hydroquinone inhibited vinyl acetate (run 4, Table II). The standard was the same as that used in Example I.

The following results were obtained:

Table II

| Run | Inhibitor | Concentration, p.p.m. | Induction Period, min. | Relative Rate of Polymerization (cm./min.) |
|---|---|---|---|---|
| 1 | Tenox BHA | 15 | 121 | 0.340 |
| 2 | Tenox BHA | 17 | 129 | 0.310 |
| 3 | Tenox BHA | 20 | 130 | 0.270 |
| 4 | Hydroquinone | 17 | 120 | 0.346 |

As is apparent from Table II, the rate of polymerization and induction time for the vinyl acetate containing 15 p.p.m. Tenox BHA polymerized according to the present invention was comparable to that produced by the conventional hydroquinone. Table II also shows that an increase in the concentration of Tenox BHA increases the induction period. This is beneficial since it is thus possible to select the desired induction period by selecting the Tenox BHA concentration which gives the desired induction period.

Further, it has been found that where the concentration of Tenox BHA is above about 15 p.p.m. an increase in the Tenox BHA concentration produces a decrease in the polymerization rate of the vinyl acetate monomer. This decrease in rate of polymerization with increased concentration of Tenox BHA is shown in Table II above. The fact that Tenox BHA can be employed to decrease the rate of polymerization as well as to increase the induction period is very important since it is very convenient and important to be able to control the rate of polymerization in many processing procedures. Thus, the stabilizers or inhibitors of the present invention are not only highly effective in preventing spontaneous polymerization of vinyl acetate, but additionally, they may be employed in concentrations such that the desired induction periods or polymerization rates are obtained.

The vinyl acetate stabilized with the food grade antioxidant inhibitors of the present invention may be pure or distilled vinyl acetate, emulsion grade vinyl acetate, such as co-polymer emulsion containing vinyl acetate, or any other conventional grades of vinyl acetate which are well-known in the art.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. Vinyl acetate stabilized with from 1 p.p.m. to 100 p.p.m. of food grade butylated hydroxyanisole.

2. A stabilized composition of matter comprising vinyl acetate and from 1 p.p.m. to 100 p.p.m. of a member selected from the group consisting of 2-tertiary butyl-4-hydroxyanisole, 3-tertiary butyl-4-hydroxyanisole, and mixtures thereof.

3. The stabilized composition of claim 2, wherein the amount of said member is between about 10 p.p.m. and 40 p.p.m.

4. The stabilized composition of claim 2, wherein the amount of said member is between about 10 p.p.m. and 25 p.p.m.

5. A method for stabilizing vinyl acetate monomer which comprises adding to the vinyl acetate monomer from 1 p.p.m. to 100 p.p.m. of a member selected from the group consisting of 2-tertiary butyl-4-hydroxyanisole, 3-tertiary butyl-4-hydroxyanisole, and mixtures thereof.

6. The method of claim 5, wherein the amount of said member is from about 10 p.p.m. to 40 p.p.m.

7. The method of claim 5, wherein the amount of said member is from about 10 p.p.m. to 25 p.p.m.

8. A method which comprises stabilizing vinyl acetate monomer by the addition thereto of from 1 p.p.m. to 100 p.p.m. by weight of a member selected from the group consisting of 2-tertiary butyl-4-hydroxyanisole, 3-tertiary butyl-4-hydroxyanisole, and mixtures thereof, and subsequently polymerizing said stabilized vinyl acetate monomer without removing said member by heating said stabilized monomer in the presence of a catalytic amount of a free radical polymerization initiator.

9. The method of claim 8, wherein the amount of said member is from about 10 p.p.m. to 40 p.p.m.

10. The method of claim 8, wherein the amount of said member is from about 10 p.p.m. to 25 p.p.m.

11. A method for controlling the rate of polymerization of vinyl acetate monomer in the presence of a free radical catalyst which method is comprised of adding to the vinyl acetate monomer prior to polymerization from about 15 p.p.m. to 100 p.p.m. of a member selected from the group consisting of 2-tertiary butyl-4-hydroxyanisole, 3-tertiary butyl-4-hydroxyanisole, and mixtures thereof such that the rate of polymerization decreases as the quantity of said member is increased.

12. The method of claim 11, wherein the amount of said member is from about 15 p.p.m. to 40 p.p.m.

13. The method of claim 11, wherein the amount of said member is from about 15 p.p.m. to 25 p.p.m.

References Cited in the file of this patent

UNITED STATES PATENTS 2,729,671   Bickford et al. _____ Jan. 3, 1956